UNITED STATES PATENT OFFICE.

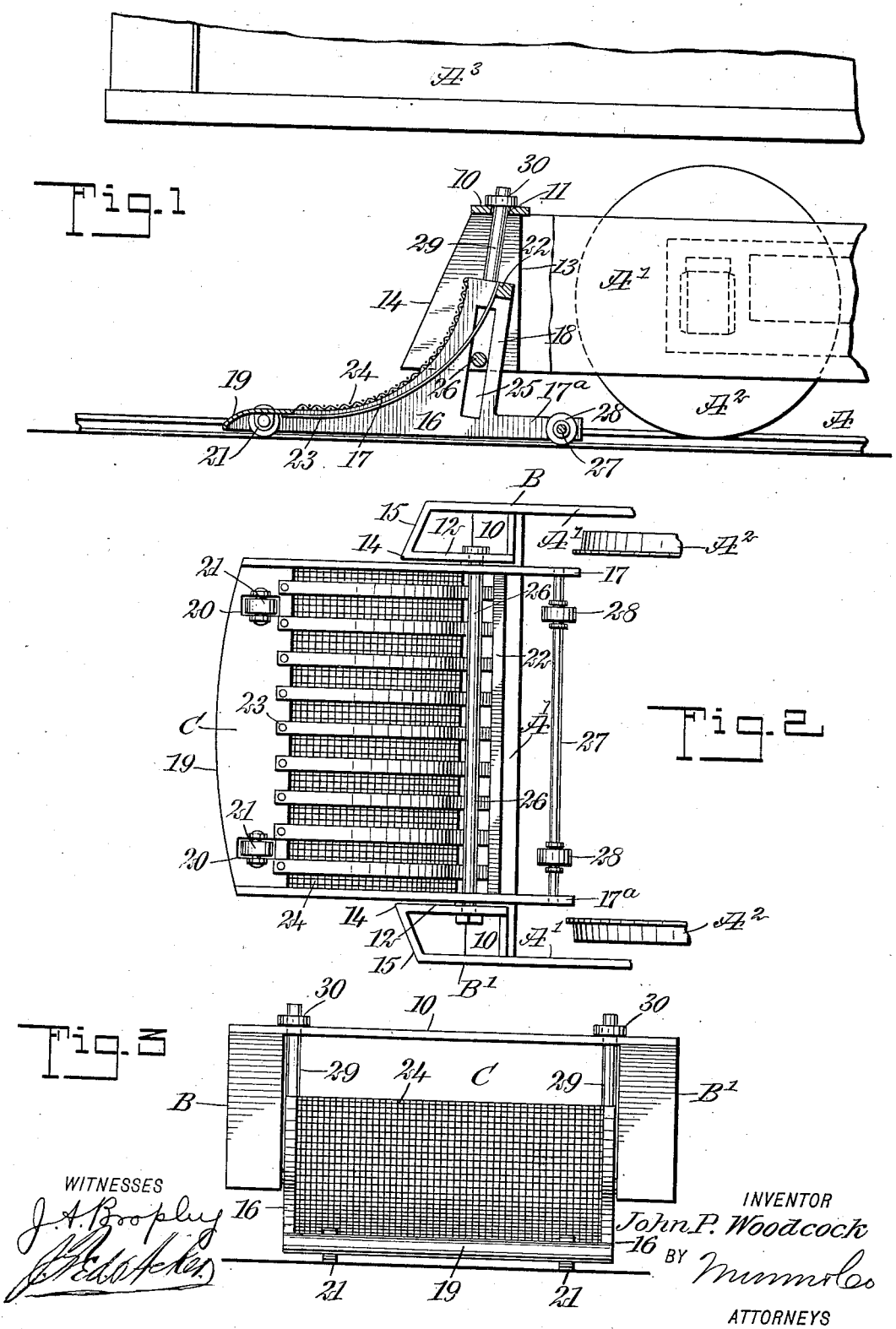

JOHN P. WOODCOCK, OF NEW YORK, N. Y.

CAR-FENDER.

No. 895,929.	Specification of Letters Patent.	Patented Aug. 11, 1908.

Application filed January 14, 1908. Serial No. 410,742.

*To all whom it may concern:*

Be it known that I, JOHN P. WOODCOCK, a citizen of the United States, and a resident of the city of New York, borough of Brooklyn, in the county of Kings and State of New York, have invented a new and useful Improvement in Car-Fenders, of which the following is a full, clear, and exact description.

The purpose of the invention is to provide a very simple, durable, and economic form of fender capable of application to the truck of any car, which fender will be beneath the platform and will perfectly safeguard a person or object struck, from contact with the wheels of the truck.

It is a further purpose of the invention to construct the fender in three sections, two side sections that are stationarily placed upon the truck in front of the forward wheels, and a central section located between the rails and having sliding connection with the side sections.

It is also a purpose of the invention to provide the central fender section with two elastic receiving surfaces, an outer one of wire mesh and an underlying one of spring slats, thus enabling this portion of the fender to sustain considerable shock without injury.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a vertical central section through the fender and a sectional side elevation of a portion of the car body and the truck; Fig. 2 is a bottom plan view of the fender; and Fig. 3 is a front elevation thereof.

A represents the rails, A' a portion of the truck, A² the wheels of the truck, and A³ the platform portion of the car body. The fender is constructed in three sections as has been stated, two side sections B and B', and a central section C. The side sections B and B' are preferably made of metal and are hollow in the interest of lightness, and are connected at the top by a cross bar 10 which has openings 11 therein adjacent its ends. The inner face 12 of each side section B and B' is straight and flat as are likewise the rear faces 13 of said sections, which are secured to the forward portions of the truck at its sides, as is shown in Fig. 2, thus bringing the side sections of the fender in front of the wheels A², and the side sections of the said fender extend out to the outer faces of the guard rails for the truck. The forward faces of the side sections B and B' are inclined from the top downwardly and forwardly, as is shown at 14 in Fig. 1, and these forward side faces are likewise laterally inclined, the lateral inclination being from the inner forward edge outward and rearward, as is shown at 15 in Fig. 2. Thus any object struck by the forward faces of the side sections B and B' of the fender will be directed toward the sides of the car and thrown beyond said sides, clearing the trucks and likewise the wheels of the car.

The central section C consists of side pieces 16 that are of greatest depth at their rear or body portions 18, since their forward edges 17 are curved from the top downwardly and forwardly, rendering the said side faces 16 extremely narrow or shallow at their forward ends, as is clearly illustrated in Fig. 1. At the forward end of the section C, a guard plate is secured at the upper edges of the said side pieces 16, their lower edges being straight. This guard plate 19 is more or less curved and is provided with openings 20 adjacent its ends, and a friction roller 21 is located in each opening, adapted to travel on the surface between the rails A, as is shown in Fig. 1.

Spring slats 23 are secured at the lower ends of the under rear face section of the guard plate 19 and are carried upward on curved lines so that their forward faces are concaved, to an engagement with a cross bar 22 located at the upper rear portion of the side pieces 16, and connecting said side pieces. These slats constitute the inner or lower bed for the section C. The outer bed consists of a wire mesh 24 that is attached also to the guard plate and to the sides of the side members 16 of said section and extends to the upper edge thereof, whereby ample space is provided between these two beds to permit the outer one 24 to yield properly on all occasions.

A vertical slot 25 is made in the body 18 of each side piece 16, and a rod 26 extends through this slot, the ends of the rod being secured in the side sections B and B', as is shown in Fig. 2. An arm 17ª is made to extend from the rear lower portion of each side piece 16, and these arms at the rear are connected by a rod 27, and on this rod friction rollers 28 are mounted to turn that support the rear portion of the said central section, and the said central section C is guided in its vertical movement by posts 29 that extend from the upper edge of its side pieces 16 at the rear through the openings 11 in the top plate 10 connecting the side sections, the said posts 29 being provided with nuts 30 at their upper ends.

This fender is exceedingly simple, well adapted to any truck, and will act as a perfect guard to prevent persons getting under the wheels of the car, and likewise provides an effective receiving section for such persons as are caught between the rails.

Having thus described my invention, I claim as new and desire to secure by Letters Patent,—

1. A car fender consisting of side sections adapted to be fixedly secured to the sides of the car truck, a central section to lie between the rails, and means slidably connecting the central section with the side sections.

2. A car fender consisting of side sections adapted to be fixedly secured to the sides of the car truck, and a central section slidably supported between the side sections, the side sections having their forward faces downwardly and forwardly inclined and likewise inclined laterally in an outward and rearward direction, the central section being provided with a concaved yielding surface.

3. The combination with the truck of a car, of a fender comprising side sections secured to the forward side portions of the car and having their forward faces downwardly and forwardly inclined, and also outwardly and rearwardly inclined, and a central section having an adjustable vertical connection with the side sections, said central section comprising connected side members whose forward edges are concaved, and spaced, yielding beds supported by said members at and adjacent their edges.

4. The combination with the truck of a car, of a fender comprising side sections secured to the forward side portions of the car and having their forward faces downwardly and forwardly inclined and also outwardly and rearwardly inclined, and a central section having an adjustable vertical connection with the side sections, said central section comprising connected side members whose forward edges are concaved, and spaced, yielding beds supported by said members at and adjacent their ends, the outer bed being of a reticulated material and the inner bed consisting of a series of curved spring slats, and rollers carried by the bottom portion of said central member.

In testimony whereof I have signed my name to this specification in the presence of two subscribing witnesses.

JOHN P. WOODCOCK.

Witnesses:
CHARLES PARTRIDGE,
EDNA HUNKEN.